United States Patent [19]

Burgos

[11] Patent Number: 5,257,474

[45] Date of Patent: Nov. 2, 1993

[54] CATTLE ACT FLY-TRAP

[76] Inventor: Margaret P. Burgos, 1079 Olde Gainesville Rd., Interlachen, Fla. 32148

[21] Appl. No.: 6,932

[22] Filed: Jan. 21, 1993

[51] Int. Cl.$^5$ .............................................. A01M 1/20
[52] U.S. Cl. ..................................................... 43/107
[58] Field of Search ........................ 43/107, 110, 111

[56]  References Cited

U.S. PATENT DOCUMENTS

| | | | |
|---|---|---|---|
| 516,048 | 3/1894 | Guthrie | 43/107 |
| 562,758 | 6/1896 | Chenault | 43/107 |
| 580,163 | 4/1897 | Richter | 43/107 |
| 642,399 | 1/1900 | White | 43/107 |
| 645,880 | 3/1900 | Varnum | 43/107 |
| 701,873 | 6/1902 | Gibson | 43/107 |
| 1,258,763 | 3/1918 | Girvin | 43/107 |
| 1,260,339 | 3/1918 | Crockenberger | 43/107 |
| 1,312,130 | 8/1919 | Merrill | 43/107 |
| 5,205,063 | 4/1993 | Sutherst | 43/107 |

Primary Examiner—Kurt C. Rowan
Attorney, Agent, or Firm—George B. Oujevolk

[57] ABSTRACT

A fly and insect trap actuated by the action of cattle is disclosed. There is a trap chamber, generally cubical in shape with an entrance having a bamboo curtain, with bamboo rods with ornaments which are attractive to cattle. Attached to the ceiling chamber is a cloth brush disposed to brush the backs of cattle passing through the chamber; attractants for flies and insects are also attached to the ceiling with one-way apertures for the insects to pass through. Cattle passing through the chamber pass through an exit door disposed so as to brush the cattle as they leave the chamber. The chamber may also have a hoof bath at the bottom of the chamber.

4 Claims, 2 Drawing Sheets

CATTLE ACT FLY-TRAP

BACKGROUND OF THE INVENTION

The present invention relates to a fly-trap to trap flies who infest the backs of cattle, and more particularly to a trap which is actuated by the cattle themselves without human action to brush off the insects.

BRIEF DESCRIPTION OF THE PRIOR ART

The action of insects, particularly flies on cattle is well known. Indeed, in Africa, the action of the Tse-tse fly on cattle acts to kill the particular beast which is attacked by this fly. In the United States and in Puerto Rico, flies and other insects will make the beasts sick. To combat flies and insects, heretofore, it has been the practice for the cattle-owners to spray or powder the animals. The difficulty here is that the person using the spray or powder does not have the necessary cooperation of the animal. Thus, the animals tend to run from the person trying to help them and often succeed in escaping the sanitary treatment. The result is therefore only partially effective in containing the flies or insects.

However, a study of cattle has shown that these animals like to go through doors. They are not afraid of doors and will often go through the same door several times brushing their skin against the parts of the door and its frame so as to brush off flies and insects. The present invention takes into account the natural tendency of cattle to go through doors.

SUMMARY OF THE INVENTION

Generally speaking, the cattle-act fly trap visualized herein contemplates a trap chamber generally cubical in shape, large enough to accomodate a cow or a bull. At one end is the entrance defined by a bamboo curtain with bamboo rods fastened to a ceiling. The bamboo rods will have ornaments thereon which are attractive to cattle. The side walls are solid and the exit gate has swinging doors which the cattle will brush against as they pass through. The bottom of the chamber will have a diesel oil and water mixture hoof bath for the cattle passing through. At the top of the chamber there will be a maze with lights to lure flys displaced from the backs of cattle, vents will be provided along the side walls to supply air as the cattle pass through. Optionally, the maze may be electrified at a current low enough so as not to bother the cattle but sufficient to kill the insects and flies.

To lure the cattle into the chamber, a feed station can be provided at the exit end of the chamber. In practice, it has been found that cattle enjoy going through the chamber, particularly after they have made a few trips through the chamber and been relieved of flies and insects on their skin.

The trap chamber is portable and can be moved from place to place in the field where the cattle are grazing.

The invention, as well as other objects and advantages thereof will be more apparent from the following detailed description together with the accompanying drawings, in which:

DETAILED DESCRIPTION

Figure 1:
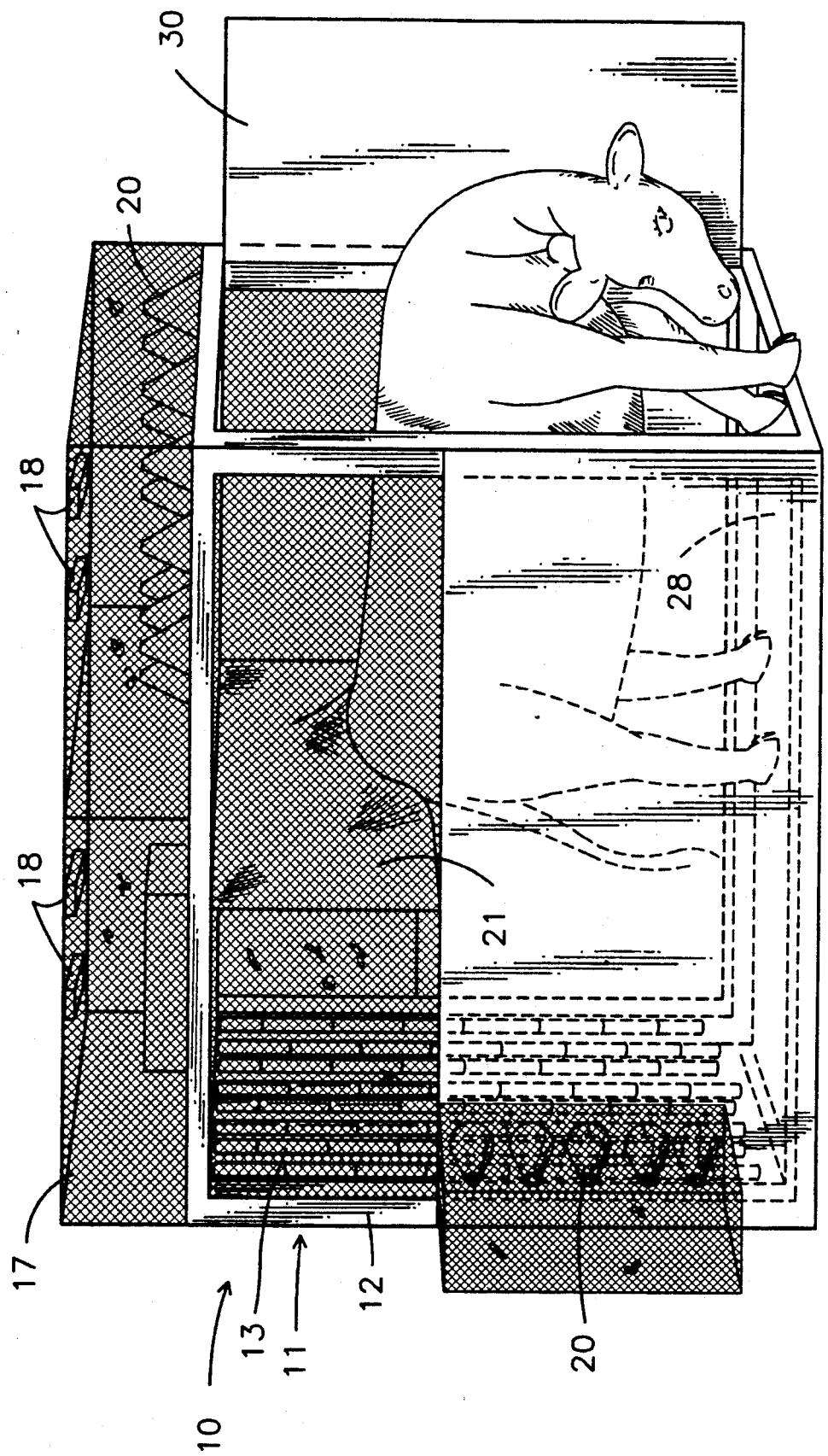
FIG. 1 is a side perspective view of the trap chamber contemplated herein.
Figure 2:
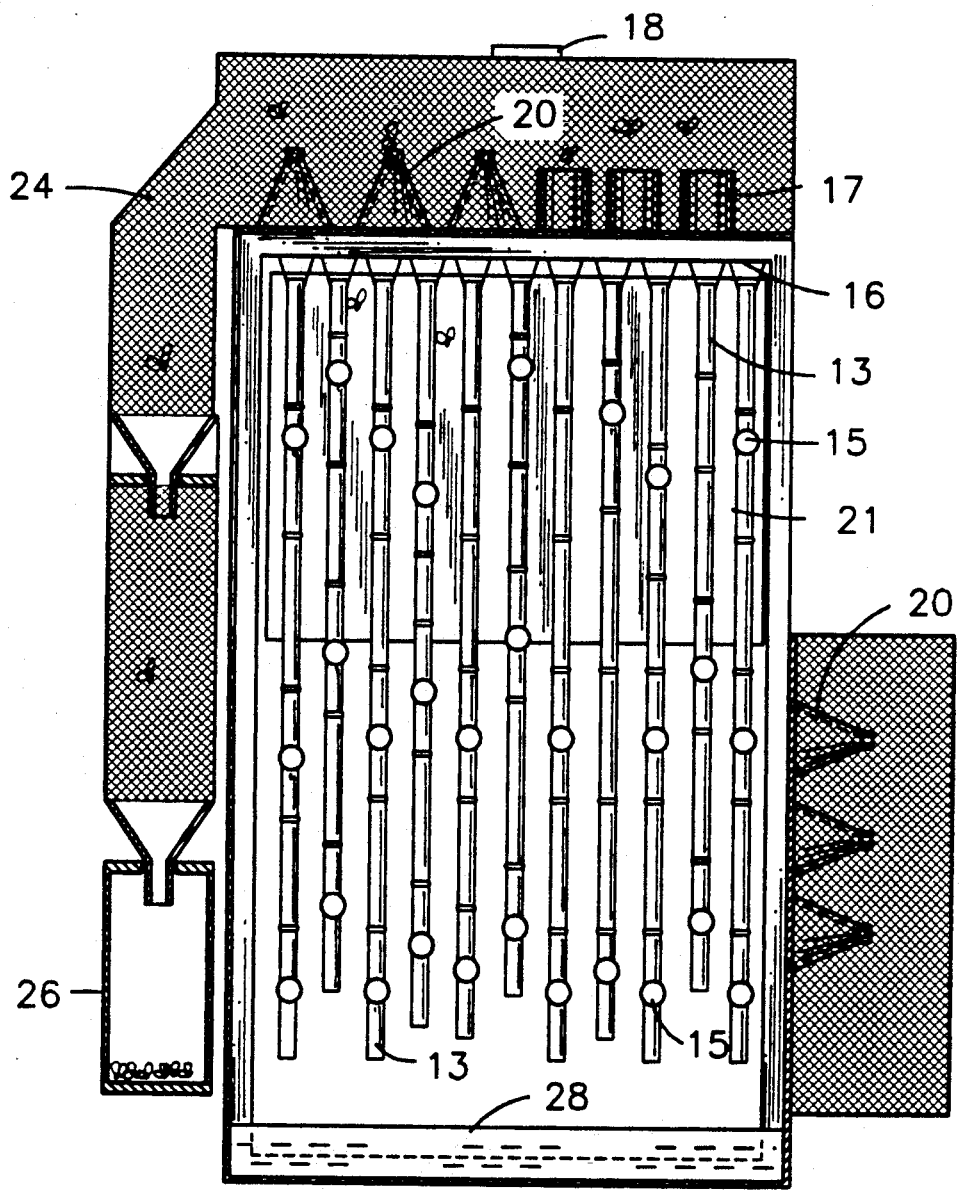
FIG. 2 depicts the entrance from a frontal view of the trap chamber shown in FIG. 1

The trap chamber 10 has an inlet side 11, with a frame 12 which holds a plurality of horizontally hanging bamboo rods 13. These bamboo rods 13 have ornaments 15 which will attract cattle. The rods hang from the chamber ceiling 16. The ceiling in turn has a maze 17 or attractants 18 with one-way apertures 20 for flies and other insects. Also hanging from the ceiling inside the chamber is a cloth brush 21 which will tend to cover cattle entering the chamber and brush off any flies or insects. At the side of the chamber is a discharge 24 having an outlet 26 where the dead flies and insects are received and thrown outside the chamber. At the bottom of the chamber is a hoof bath 28 which cattle must step into to exit the chamber. At the exit end of the chamber is door 30 which the cattle must brush against to open.

Thus, the present invention provides for a method of treating cattle to remove flies and insects from the animals by having an animal pass through a fly-trap chamber 10, entering through a bamboo screen with vertical rods 13. As the animal passes through the chamber, the animal will be brushed by a cloth brush 21 which will brush off any flies and insects on the back of the animal. To further cleanse the animal of unwanted flies and insects, the animal will step through a hoof bath as he passes through the chamber. Flies and insects will be attracted to the ceiling 16 which has a maze 17 preventing the flies and insects from returning to the animal. There is another door 30 at the end of the chamber and the animal must brush against the door to exit the chamber. The trip through the chamber is pleasing to the animal who will return for another passage without any prodding.

It is to be observed therefore that the present invention provides for a cattle action or cattle act fly-trap which is activated by the cattle themselves and comprises a trap chamber 10 with an inlet side 11. On the inlet side there is a frame 12 holding a plurality of hanging bamboo rods 13 having ornaments 15 which will attract cattle. The ceiling in turn will have a maze 17 or attractants with one-way apertures 20. A cloth brush 21 hangs from the ceiling to brush of flies and insects. At the exit end of the chamber is a door 30 which cattle must brush against in order to open the door.

The invention also contemplates a method to rid cattle of flies and insects by providing a trap chamber 10 having a plurality of bamboo rods hanging vertically. Inside the chamber there is a cloth brush hanging from the ceiling. The ceiling in turn will have a maze 17 to trap flies and insects. Again the cattle must brush against a door at the exit to leave the chamber.

To discharge the flies and insects from the upper part of the chamber, a blower is used. This is preferably a portable electric blower which is inserted in the upper part of the chamber and blows the flies and insects into the discharge 24.

What is claimed is:

1. A fly and insect trap actuated by the action of cattle, comprising in combination:
   a) a trap chamber, generally cubical in shape;
   b) an entrance defined in said chamber having a bamboo curtain with bamboo rods disposed horizontally at said defined entrance, said rods having ornaments which are attractive to cattle;

c) a ceiling for said chamber, with a cloth brush attached to said ceiling disposed so as to brush the backs of cattle passing through the chamber;

d) attractants for flies and insects in the ceiling with one-way apertures for the flies and insects to pass through; and, e) an exit defined in said chamber with a door that cattle must brush against to leave the chamber.

2. A trap as defined in claim 1 including a hoof bath defined at the bottom of said chamber.

3. A trap as defined in claim 1 including a discharge with an outlet at the side of the chamber to remove dead flies and insects.

4. A method of removing flies and insects from cattle comprising the steps of having individual animals pass through a chamber having a bamboo curtain at one end to brush off flies and insects, with a brush attached to the chamber ceiling disposed to sweep across the back of an animal passing through the chamber with a hoof bath at the bottom of the chamber, and an exit door that the animal must brush against to leave the chamber.

* * * * *